(12) United States Patent
Klotblixt

(10) Patent No.: US 10,850,375 B2
(45) Date of Patent: Dec. 1, 2020

(54) CLAMP FORCE ESTIMATION VIA PULSED TIGHTENING

(71) Applicant: ATLAS COPCO INDUSTRIAL TECHNIQUE AB, Stockholm (SE)

(72) Inventor: Adam Klotblixt, Stockholm (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 23 days.

(21) Appl. No.: 16/305,561

(22) PCT Filed: May 30, 2017

(86) PCT No.: PCT/EP2017/063006
§ 371 (c)(1),
(2) Date: Nov. 29, 2018

(87) PCT Pub. No.: WO2017/027549
PCT Pub. Date: Dec. 7, 2017

(65) Prior Publication Data
US 2020/0055169 A1    Feb. 20, 2020

(30) Foreign Application Priority Data
Jun. 3, 2016  (SE) ...................... 1630139

(51) Int. Cl.
*B25B 23/147* (2006.01)
*B25B 23/145* (2006.01)
(Continued)

(52) U.S. Cl.
CPC ........ *B25B 23/147* (2013.01); *B25B 23/1456* (2013.01); *B23P 19/066* (2013.01);
(Continued)

(58) Field of Classification Search
None
See application file for complete search history.

(56) References Cited

U.S. PATENT DOCUMENTS 5,571,971 A    11/1996  Chastel et al.
5,970,798 A *  10/1999  Gleman ................ G01L 5/246
                                                           73/761

(Continued)

FOREIGN PATENT DOCUMENTS

WO    2015139952 A1    9/2015

OTHER PUBLICATIONS

International Search Report (ISR), Written Opinion, and International Preliminary Report on Patentability (IPRP) dated Sep. 6, 2017 issued in International Application No. PCT/EP2017/063006.

(Continued)

*Primary Examiner* — Natalie Huls
*Assistant Examiner* — Jermaine L Jenkins
(74) *Attorney, Agent, or Firm* — Holtz, Holtz & Volek PC

(57) ABSTRACT

A method for estimating a clamp force obtained at tightening of a screw joint via a torque pulse sequence includes applying a primary torque pulse to rotate the screw joint in a tightening direction, measuring a torque level obtained by the primary torque pulse, applying a secondary torque pulse to move the screw joint in a loosening direction, measuring a torque level obtained by the secondary torque pulse, and calculating a difference between the torque level obtained by the primary torque pulse and the torque level obtained by the secondary torque pulse. The obtained clamp force is estimated from the difference between the obtained torque levels.

3 Claims, 1 Drawing Sheet

(51) Int. Cl.
    *B23P 19/06*           (2006.01)
    *B25B 21/02*           (2006.01)
    *F16D 66/00*           (2006.01)
    *F16H 61/32*           (2006.01)

(52) U.S. Cl.
    CPC ...... *B25B 21/026* (2013.01); *F16D 2066/005* (2013.01); *F16H 61/32* (2013.01)

(56) References Cited

U.S. PATENT DOCUMENTS

| | | | |
|---|---|---|---|
| 7,155,986 B2 * | 1/2007 | Kawai | B25B 21/02 |
| | | | 73/862.21 |
| 7,770,658 B2 * | 8/2010 | Ito | B23P 19/066 |
| | | | 173/1 |
| 8,910,526 B2 * | 12/2014 | Carlsson | G01L 3/102 |
| | | | 73/761 |
| 9,314,908 B2 * | 4/2016 | Tanimoto | B25B 21/02 |
| 2009/0014192 A1 | 1/2009 | Ito et al. | |
| 2009/0112488 A1 | 4/2009 | Haberl et al. | |
| 2017/0043460 A1 | 2/2017 | Gustafsson | |

OTHER PUBLICATIONS

Chinese Office Action dated Dec. 3, 2019 issued in Chinese Application No. 201780033814.7.

\* cited by examiner

CLAMP FORCE ESTIMATION VIA PULSED TIGHTENING

The invention relates to a method for estimating the clamp force accomplished at a screw joint tightening process. In particular, the invention concerns a method for clamp force estimation at a screw joint tightening process performed by a pulse activated power wrench.

Normally when tightening a screw joint it is difficult to measure or even calculate the accomplished clamping force as a result of a tightening process. The easiest and less complicated way of measuring a tightening result is to indicate the applied torque, but that is not relevant to the ultimate and most important purpose of the tightening process, namely to accomplish a clamp force. The uncertain factor is the friction forces in the screw joint which causes a false indication of the tightening result, especially since the friction coefficient is far from constant.

The safest way so far to get a reliable information on the obtained clamp force has been to use extra means like collapsible washers, screw tensioning equipment or equipment for measuring supersonic sound wave travel time through the screw joint, but these methods are time consuming and/or expensive and not suitable for assembly line operations. Another method to get information on the clamp force without using extra equipment is to tighten the screw joint up to the yield point, i.e. the tightening level where the screw joint material reaches its plastic deformation zone. The load level at which the material starts yielding plastically is known for the material in the actual screw joint and would correspond to the obtained clamp force. Unfortunately, this method too is dependent on frictional influence which means that the screw joint is exposed to a combination of axial and torsional strain which affects the yield point level. This means that the yield point will not be reached as a result of axial load or clamp force alone and that the clamp force does not fully correspond to the yield point strain in the screw joint.

However, there is another method for getting information of the clamp force actually obtained at tightening a screw joint wherein the influence of the frictional resistance in the screw joint is eliminated. That known method is based on a process of eliminating the frictional influence and comprises a sequence of tightening the screw joint to a certain torque level followed by an application of a reverse torque to the screw joint so as to accomplish a movement of the screw joint in the loosening direction. The difference in applied tightening torque and loosening torque indicates the magnitude of the frictional resistance in the screw joint, which means that the screw joint could be tightened to a target pretension level just by measuring the applied torque and subtracting the torque resistance caused by friction.

A process of the above mentioned type for calculating and estimating the clamp force obtained in a screw joint by applying alternating tightening and loosening torque to the joint is previously described in U.S. Pat. No. 5,571,971. According to this prior art method alternating tightening and loosening torque is applied on the screw joint via continuous torque delivering equipment which in case of hand held power wrenches results in undesirable and tiresome stress forces on the operator.

It is an object of the invention to provide a method for obtaining a reliable information on and control of the clamp force actually obtained at tightening a screw joint without the use of any extra advanced equipment.

Another object of the invention is to provide a method for obtaining a reliable information on and control of the clamp force actually obtained at tightening a screw joint via an estimation process wherein the influence of frictional forces is eliminated via alternating tightening and loosening sequences.

Still another object of the invention is to provide a method for obtaining a reliable information on and control of the actually obtained clamp force in a screw joint without giving rise to any severe reaction forces in the torque delivering equipment.

Further objects and advantages of the invention will appear from the following specification and claims.

A preferred embodiment of the invention will be described below with reference to the accompanying drawing.

In the drawing

Figure 1:
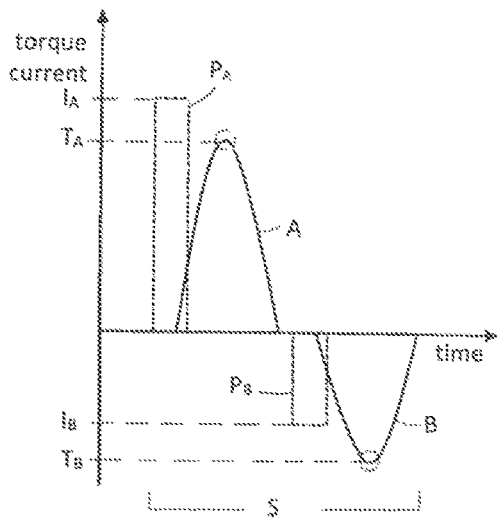
FIG. 1 shows a graph illustrating a torque pulse sequence according to the invention.

The method according to the invention as illustrated in the drawing graphs comprises a way to getting information of the clamp force obtained in a tightened screw joint without employing extra physical means like collapsible washers or advanced equipment for screw joint tensioning or ultrasonic wave travel time measurements. Instead, the invention provides a method in which a simple and straightforwardly designed power wrench may be used, i.e. an electric power wrench provided with a torque transducer and controlled by a current pulse producing unit.

As mentioned above the invention aims at simplified way to get information on and control of the obtained clamp force in a screw joint during tightening, and an important object of the invention is to get information of the obtained clamp force just by torque measurement. However, this means that the influence of the frictional forces in the screw joint has to be eliminated so that the measured and installed torque corresponds to the obtained clamp force. This is accomplished by using the basic principle of the prior art method described in the above mentioned publication, wherein the difference in torque between tightening and loosening the screw joint is measured and calculated. This difference in torque is caused by the frictional resistance in the joint. However, the improved method according to the invention which is based on application of distinct current pulses on the screw joint being tightened means a substantial improvement both regarding process duration and ergonomic strain on the operator. Also in case of a torque delivering power tool or torque spindle carried on a mechanical fixture there is obtained the advantage of less requirements on the sturdiness of fixture due to reduced reaction forces.

According to the invention the torque application on the screw joint in the tightening direction as well as in the loosening direction are applied in the form of torque pulses, wherein determination of the obtained clamp force is basically performed via a torque pulse sequence each comprising an initial primary torque pulse in the tightening direction of the screw joint followed by a secondary torque pulse in the loosening direction. The torque magnitude accomplished by the tightening directed pulse is measured, as is the torque magnitude effective to accomplish a slight movement of the screw joint in the loosening direction, whereupon the difference in magnitude between torque magnitudes of the primary and secondary pulses is calculated. This difference in torque magnitudes corresponds to the frictional resistance in the screw joint, which means that the friction related source of error may be eliminated and the actually obtained clamp force in the screw joint could be estimated.

In FIG. 1, with torque T and current I on the Y-axis and time t on the X-axis, there is illustrated a torque pulse sequence S comprising a primary torque pulse A accomplished by an electric current pulse $P_A$ of a magnitude $I_A$ delivered to the electric motor of the power wrench being used, and a secondary torque pulse B accomplished by an oppositely directed electric current pulse $P_B$ of a magnitude $I_B$ delivered to the power wrench motor. The primary torque pulse A reaches a torque magnitude $T_A$, whereas the secondary torque pulse B has an oppositely directed torque magnitude $T_B$. The torque magnitudes $T_A$ and $T_B$ are registered, and the difference between them is calculated. From that difference the clamp force obtained at the end of the primary torque impulse A may be estimated. As illustrated in FIG. 1 the secondary pulse B is accomplished by an oppositely directed electric current pulse $P_B$ which has a substantially lower magnitude $I_B$ than the magnitude $I_A$ of the primary pulse $P_A$. This means that the secondary torque pulse B would not become strong enough to loosen the screw joint completely just accomplishing a slight movement in the loosening direction. You want the screw joint to be loosened just such a short distance that the loosening torque $T_b$ may be measured.

Figure 2:
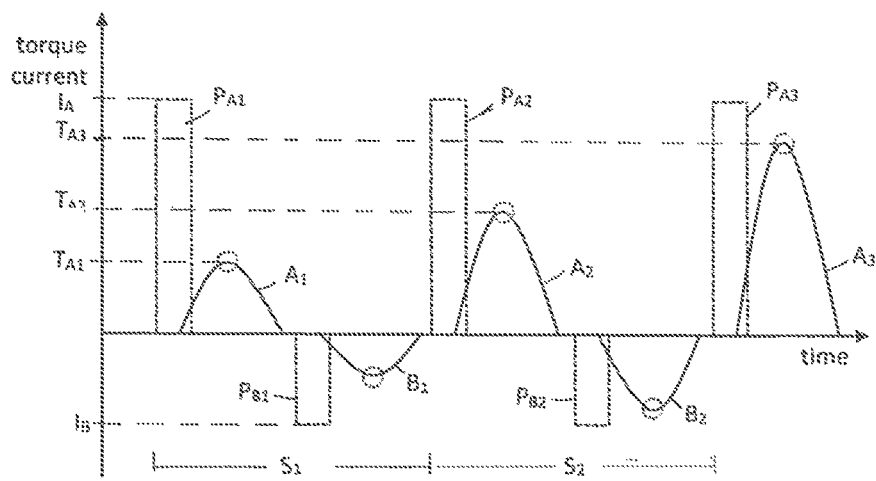
FIG. 2 shows a graph illustrating a couple of consecutive torque pulse sequences according to the invention.

In FIG. 2, with torque T and current I on the Y-axis and time t on the X-axis, there is illustrated a practical way of tightening a screw joint to a desired clamp force. This tightening process comprises two consecutive pulse sequences $S_1$, and $S_2$ and a third separate torque pulse $A_3$, wherein the initial two-step increase of the torque magnitude is accomplished via tightening torque pulses $A_1$ and $A_2$ with torque magnitudes $T_{A1}$ and $T_{A2}$ and initiated by current pulses $P_{B1}$ and $P_{B2}$. In both pulse sequences $S_1$ and $S_2$ the tightening directed current pulses $P_{A1}$ and $P_{A2}$ are of the same magnitude, but the obtained torque magnitude $T_{A1}$ of the first pulse $A_1$ is lower than the torque magnitude $T_{A2}$ of the second pulse $A_2$. The differences between the obtained torque magnitudes $T_{A1}$ and $T_{A2}$ in the tightening direction and the loosening pulses $B_1$ and $B_2$ are calculated and the obtained clamp forces are estimated. Thereupon, a third current pulse $P_{A3}$ is applied resulting in the third torque pulse $A_3$ reaching a torque magnitude $T_{A3}$, wherein the clamp force obtained thereby is calculate by extrapolation of the clamp forces estimated for the two previous pulse sequences $S_1$ and $S_2$. A correlation between applied torque and resulting clamp force is established, which means that a full pulse sequence is not necessary to determine the final clamp force $T_{A3}$.

Figure 3:
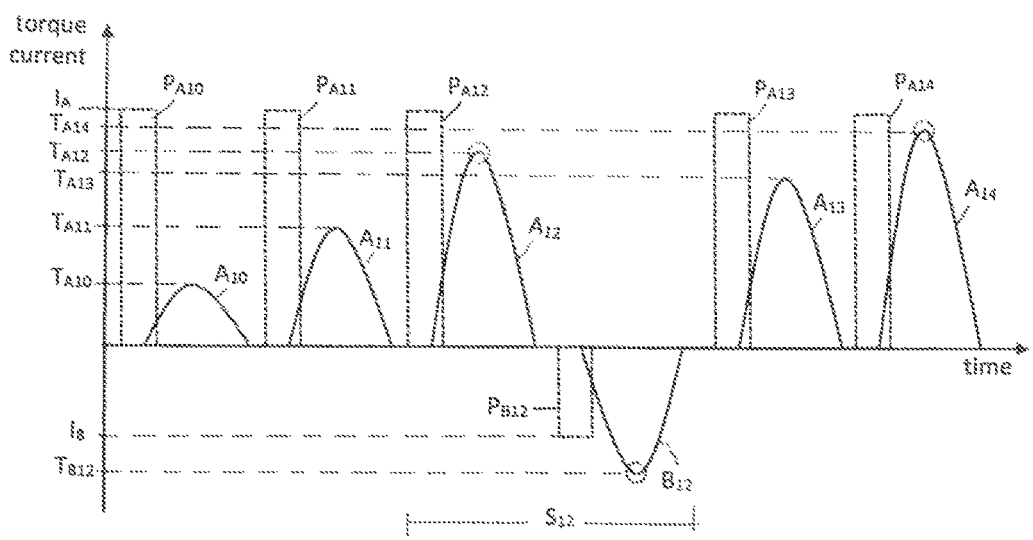
FIG. 3 shows a graph illustrating consecutive tightening pulses and a torque pulse sequence according to the invention.

In FIG. 3, with torque T and current I on the Y-axis and time t on the X-axis, there is illustrated an alternative process of tightening a screw joint by the pulse technique according to the invention. In this tightening process there are induced into the screw joint two initial torque pulses $A_{10}$ and $A_{11}$ resulting from two identical current pulses $P_{A10}$ and $P_{A11}$. The resultant torque magnitudes are stepwise increased. These two initial torque pulses are followed by a complete pulse sequence $S_{12}$ comprising a primary pulse $A_{12}$ in tightening direction followed by a current pulse $P_{B12}$ resulting in a secondary pulse $B_{12}$ in the screw joint loosening direction. This pulse sequence $S_{12}$ has the purpose of establishing the frictional resistance in the screw joint and enable estimation of the obtained clamp force. With the knowledge of the correlation between the torque level $T_{A12}$ obtained by the torque pulse $A_{12}$ and the clamp force estimated to be obtained thereby two more torque pulses $A_{13}$ and $A_{14}$ are applied with the aim to reach a predetermined target level of tightening, i.e. a desired clamp force level. This is accomplished by an extrapolation of the torque level $T_{A12}$, which corresponds to a certain estimated clamp force, and continued the tightening process via the torque pulses $A_{13}$ and $A_{14}$ until desired target clamp force is obtained at the torque level $T_{A14}$. Since the relationship between the torque level and the obtained clamp force has been estimated and determined via the complete pulse sequence $S_{12}$ the two last torque pulses do not have to be followed by torque pulses in the loosening direction of the screw joint. The tightening process could be completed just by tightening the screw joint via the torque pulses $A_{13}$ and $A_{14}$ to a torque level extrapolated from the torque level $T_{A12}$.

It is to be noted that the obtained torque level $T_{A13}$ is lower than the torque level $T_{A12}$ obtained by the preceding primary torque pulse $A_{12}$. This, however, is due to the fact that the screw joint has been somewhat moved in the loosening direction by the secondary torque pulse $B_{12}$ of the preceding pulse sequence $S_{12}$ which means that the torque pulse $A_{13}$ is started from a lower torque level. It is also to be noted that the magnitude of all the induced current pulses $P_{A10}$–$P_{A14}$ are of the same current level, namely $I_A$.

A tightening process may comprise different number of pulse sequences and torque pulses depending on the type of screw joint and operation situation. In the illustrated example the tightening process is completed by two final torque pulses $A_{13}$ and $A_{14}$ but this number of pulses is not critical per se but could be just a single one or a number of pulses as required to reach the tightening target.

A power wrench suitable for performing the method according to the invention is powered by an electric motor coupled to an output shaft via a power transmission including a torque transducer for measuring the magnitude of the torque delivered via the output shaft. The motor operation is controlled by a drive unit comprising means for delivering current pulses to the motor in dependency to the actual embodiment of the method according to the invention, i.e. how many pulse sequences and/or separate torque pulses is required. It is to be noted though that the invention is not limited to the above described example but could be varied within the scope of the claims. Accordingly, instead of using a power wrench having a pulse delivering motor to catty out the method according to the invention it is possible to use a power tool having an impulse or impact mechanism coupling the motor to the output shaft. It is required though that the motor and the impulse or impact mechanism is reversible to be able to deliver torque pulses also in the loosening direction of the screw joint.

The invention claimed is:
1. A method, for estimating a clamp force obtained at tightening of a screw joint via a torque pulse sequence, the method comprising:
   applying a primary torque pulse to rotate the screw joint in a tightening direction;
   measuring a torque level obtained by the primary torque pulse;
   applying a secondary torque pulse to move the screw joint in a loosening direction;
   measuring a torque level obtained by the secondary torque pulse; and
   calculating a difference between the torque level obtained by the primary torque pulse and the torque level obtained by the secondary torque pulse, wherein the obtained clamp force is estimated from the difference between the obtained torque levels, wherein a target clamp force is compared to the estimated clamp force, and when the estimated clamp force is lower than the target clamp force, the torque pulse sequence is repeated at successively higher torque rates, and wherein a screw joint tightening process comprises an initial stage including application of a number of subsequent primary torque pulses until a certain torque level is reached, whereupon a last of the primary torque pulses is followed by a secondary torque pulse to form a torque pulse sequence enabling estimation of an accomplished clamp force, and the target clamp force is reached by extrapolating the estimated clamp force obtained via at least one further pulse sequence.

2. A power wrench adapted to perform the method according to claim 1, the power wrench comprising an electric rotation motor coupled to an output shaft, and an operation control unit connected to the motor and comprising:

a unit for delivering torque pulses of opposed directions to the output shaft to accomplish torque pulse sequences including the primary and secondary torque pulses;

a unit for establishing a difference between torque magnitudes accomplished by the primary and secondary torque pulses; and a unit for estimating the clamp force obtained by the primary torque pulses.

3. The power wrench according to claim 2, wherein the rotation motor is an electric motor and the unit for delivering torque pulses comprises a power control unit arranged to deliver current pulses to the motor.

* * * * *